United States Patent
Kohli et al.

(10) Patent No.: US 8,559,033 B2
(45) Date of Patent: Oct. 15, 2013

(54) INTELLIGENT RECOMMENDATION OF ALTERNATE PRINTERS TO HELP EFFICIENT PRINTING

(75) Inventors: Harpreet Kohli, Penfield, NY (US); Kirk Pothos, Webster, NY (US); Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 939 days.

(21) Appl. No.: 12/102,102

(22) Filed: Apr. 14, 2008

(65) Prior Publication Data

US 2009/0257082 A1 Oct. 15, 2009

(51) Int. Cl.
*G06F 3/12* (2006.01)

(52) U.S. Cl.
USPC .......... 358/1.15; 358/1.14; 358/3.23

(58) Field of Classification Search
USPC .................................. 358/1.1–3.23
See application file for complete search history.

(56) References Cited

U.S. PATENT DOCUMENTS

| | | | |
|---|---|---|---|
| 6,032,004 A | 2/2000 | Mirabella, Jr. et al. | |
| 6,452,692 B1 * | 9/2002 | Yacoub | 358/1.15 |
| 6,529,286 B1 * | 3/2003 | King | 358/1.14 |
| 8,134,724 B2 * | 3/2012 | Kephart et al. | 358/1.15 |
| 2003/0090697 A1 * | 5/2003 | Lester et al. | 358/1.14 |
| 2005/0030574 A1 * | 2/2005 | McVey et al. | 358/1.14 |
| 2005/0102442 A1 * | 5/2005 | Ferlitsch | 710/15 |
| 2005/0141013 A1 * | 6/2005 | Kikuchi et al. | 358/1.14 |
| 2005/0190383 A1 * | 9/2005 | Levin et al. | 358/1.1 |
| 2005/0275852 A1 * | 12/2005 | Ferlitsch | 358/1.6 |
| 2006/0132826 A1 * | 6/2006 | Ciriza et al. | 358/1.15 |
| 2008/0243379 A1 | 10/2008 | Pearce | |
| 2008/0263071 A1 * | 10/2008 | Ferlitsch et al. | 707/101 |

FOREIGN PATENT DOCUMENTS

WO WO 01/29648 4/2001

OTHER PUBLICATIONS

U.S. Appl. No. 12/500,643, filed Jul. 10, 2009, Xerox, Office Action Communication, Jan. 12, 2012, 22 pages.
U.S. Appl. No. 12/500,643, filed Jul. 10, 2009, Xerox, Office Action Communication, Jul. 17, 2012, 18 pages.
U.S. Appl. No. 12/500,643, filed Jul. 10, 2009, Xerox, Office Action Communication, Sep. 28, 2012, 3 pages.
U.S. Appl. No. 12/500,643, filed Jul. 10, 2009, Xerox, Office Action Communication, May 1, 2013, 20 pages.

* cited by examiner

*Primary Examiner* — Qian Yang
*Assistant Examiner* — Marcellus Augustin
(74) *Attorney, Agent, or Firm* — Gibb & Riley, LLC

(57) ABSTRACT

A method starts when a print job is received from a workstation. The print job includes an identification of an initial printer. The method ranks the abilities of the available printers to process the print job to identify the best printer for the print job. If the initial printer is not ranked as the best printer, the method presents a question/statement to the workstation (to the user through the workstation) regarding whether to redirect the print job to the best printer.

16 Claims, 4 Drawing Sheets

Print Policy Manager

Print Job Confirmation

⚠ Are you sure you want to print to this device as it is slow and large jobs will take a long time to complete?

Print Job Details

| | | | |
|---|---|---|---|
| Document | Timesheet.xls | Impressions | 20 |
| Printer | Xerox WorkCenter 238 | Color | Yes |
| Price | $ 20.45 | Sides | 1-Sided |

Recommended Alternatives

| | Printer | Print Server | Model | Status | Price ▲ | Location |
|---|---|---|---|---|---|---|
| 🔍 | WC Pro C3545 | sdi.xerox.com | Xerox WC Pro C3545 | Ready | $10.45 | USA / NY / Webster / 111 / 1 / K8 |
| 🔍 | Phaser 1235 | mc.xerox.com | Xerox Phaser 1235 | Out of ink | $15.56 | USA / NY / Webster / 111 / 1 / N8 |
| 🔍 | WC Pro 90 | web.xerox.com | Xerox WC Pro 90 | Ready | $22.45 | USA / NY / Webster / 111 / 1 / N8 |
| 🔍 | - | - | Xerox Phaser 12.35 | Ready | $22.45 | USA / NY / Webster / 111 / 1 / N8 |

[ OK ]  [ Cancel ]

INTELLIGENT RECOMMENDATION OF ALTERNATE PRINTERS TO HELP EFFICIENT PRINTING

BACKGROUND AND SUMMARY

Embodiments herein generally relate to multiple printers systems, and more particularly to a method, service, and computer program product, that provides feedback to the user regarding printers that may be better than the printer selected by the user.

With the ability to utilize multiple printers through various print servers, management of print jobs through such systems is gaining and importance. For example, with respect to automated systems that balance printing loads within a network multi-printer system, European Patent Number 1,224,529, also assigned International Publication Number WO 01/29648, (the complete disclosure of which is incorporated herein by reference) discloses print load balancing, cluster printing and color, black-and-white page splitting. Such systems automatically route print jobs to the most available printer (without user input or feedback) based on factors such as color, black-and-white printing, printing page per minute rates, the number of pages in a job, size and number of copies in a job.

Similarly, U.S. Pat. No. 6,529,286 (the complete disclosure of which is incorporated herein by reference) discloses a dynamically shared printing interface in a computer network that routes print jobs to printers in a user defined preferred printer list based upon a printer's capability to print a certain job when the print job is requested. In this conventional system, a user sends a print job to the dynamically shared printing interface that calculates the estimated workload to print the job designated as a task allocation property, sends a multi-cast to the printers in the preferred printer list requesting printer capability information designated as a printer power index (PPI), receives the printer power index from the printers in the preferred printer list that calculate their own capability, compares the printer power index with the task allocation property, routes the print job whose printer power index best matches with the task allocation property and notifies the user of the printer to which the job is routed. The printers in the preferred printer list calculate their own printer power indexes based upon the printer engine speed, printer memory size, number, size and complexity of print jobs waiting in the printer queue at the instance the multi-cast is received. In another aspect the dynamically shared printing interface re-routes a print job if the original printer develops an error and cannot print the job, by re-sending a multi-cast to the other printers in the preferred printer list requesting printer printer power indexes, receiving printer power indexes from the printers that re-calculate their printer power index, compare the task allocation property with the resent printer power indexes, re-route the print job whose printer power index best matches the task allocation property and re-notify the user of the printer to which the job is re-routed.

However, such systems provide alternate printers recommendation in a static way by having an administrator set up custom messages to be displayed when defined conditions (also called print policies) are triggered against the submitted print job. However, such systems consume extensive administration overhead because they need to continuously maintain alternate printer configurations. Other solutions replace operating system (OS) native printing components. The embodiments herein can be leveraged in a manner that provides efficient printing functionality in an intelligent way without the need for replacing standard print components.

More specifically, the embodiments herein disclose a method that provides feedback to the user regarding printers that may be better than the printer selected by the user. More specifically, one exemplary method herein starts when a print job is received from a workstation (from a user operating a workstation). The print job includes an identification of an initial printer. The method ranks the abilities of the available printers to process the print job to identify the best printer for the print job.

If the initial printer is not ranked as the best printer, the method presents a question to the workstation (to the user through the workstation) regarding whether to redirect the print job to the best printer (depending upon user rights, the question can require the workstation to redirect the print job to the best printer). Thus, embodiments herein recommend the alternate printers that are considered to be efficient for the user or more appropriate for the end-user. If end-user decides to send the same job to one of the alternate printers, then he/she will resubmit the job to the alternate. If the initial printer is ranked as the best printer, the method simply allows the print job to be processed by the best printer without presenting any questions to the user through the workstation.

The ranking of the available printers is based on each of the printer's characteristics including cost per print, specific printer utilization rate, specific printer capability, printer availability, printer physical proximity to the workstation, and user rights to each printer. When presenting the question, the method can also supply to the workstation information regarding ranking characteristics used to determine which printer is the best printer. Similarly, when presenting the question, the method can provide the workstation with a plurality of alternate printers to choose from, and such alternate printers can be ranked according to the previously established ranking from best to worst.

In addition, the embodiments herein also include systems. For example, one exemplary system embodiment comprises a print server operatively connected to a workstation. Again, the workstation generates the print job and supplies the job to the print server. Many available printers are operatively connected to the print server and the print job includes an identification of one of the available printers as the initial printer. A policy server is also operatively connected to the print server. The policy server ranks abilities of the available printers to process the print job to identify a best printer for the print job.

If the initial printer is not ranked as the best printer, the print server presents a question on the workstation regarding whether to redirect the print job to the best printer. Thus, embodiments herein recommend the alternate printers that are considered to be efficient for the user or more appropriate for the end-user. If end-user decides to send the same job to one of the alternate printers, then he/she will resubmit the job to the alternate. If the initial printer is ranked as the best printer, the print server allows the print job to be processed by the best printer, without presenting any questions to the user through the workstation.

The policy server ranks the available printers based on printer characteristics including cost, printer utilization rate, printer capability, printer availability, printer proximity, and user rights to a printer. When presenting the question, the print server can supply to the workstation information regarding ranking characteristics used to determine which printer is the best printer. Similarly, when presenting the question, the print server can supply, to the workstation, a plurality of alternate printers that are ranked according to the ranking, from best to worst.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 4 is a schematic diagram of a graphic user interface screenshot according to embodiments herein.

DETAILED DESCRIPTION

Figure 1:
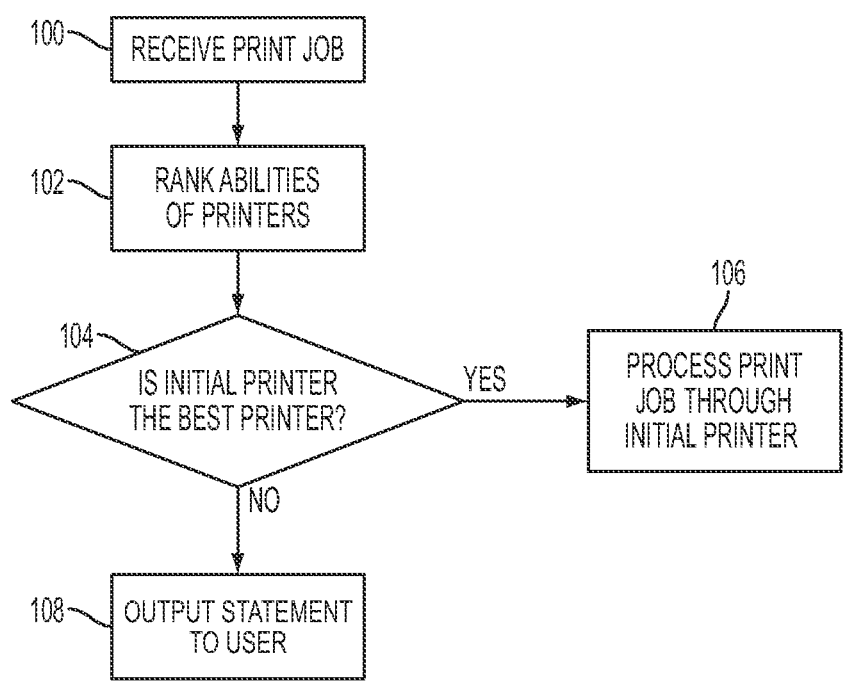
FIG. 1 is a flow diagram illustrating an embodiment herein.

As mentioned above, with embodiments herein suitable alternate printers are recommended to the user if the user has not selected the best printer on their own. One exemplary method embodiment herein that provides feedback to the user regarding printers that may be better than the printer selected by the user is shown in flowchart form and FIG. 1. More specifically, in item 100 in FIG. 1, the method starts when a print job is received from a workstation (from a user operating a workstation). The print job includes an identification of an initial printer. In item 102, the method ranks the abilities of the available printers to process the print job to identify the best printer for the print job.

Decision box 104 determines whether the initial printer selected by the user is actually the best printer (according to the ranking). If the initial printer is ranked as the best printer, the method simply allows the print job to be processed by the initial printer in item 106, without presenting any questions to the user through the workstation.

However, if the initial printer is not ranked as the best printer, in item 108 the method outputs at least one question or statement to the workstation (to the user through the workstation) regarding whether to redirect the print job to the best printer (depending upon user rights, the question can require the workstation to redirect the print job to the best printer). Thus, embodiments herein recommend the alternate printers that are considered to be efficient for the user or more appropriate for the end-user. If end-user decides to send the same job to one of the alternate printers, then he/she will resubmit the job to the alternate.

Thus, with embodiments herein suitable alternate printers are recommended to the end-user. Such recommendation can be provided either as a confirmation so that user still has a choice and can ignore the recommendation and continue printing at the originally selected printer, or as an enforcement by cancelling the user's print job and informing the user to re-submit the print document to an alternate recommended printer.

The ranking 102 of the available printers is based on each of the printer's characteristics including cost per print, specific printer utilization rate, specific printer capability, printer availability, printer physical proximity to the workstation, and user rights to each printer. When presenting the questions/statements 108, the method can also supply to the workstation information regarding ranking characteristics used to determine which printer is the best printer. Similarly, when presenting the questions/statements 108, the method can provide the workstation with a plurality of alternate printers to choose from, and such alternate printers can be ranked according to the previously established ranking from best to worst.

Figure 2:
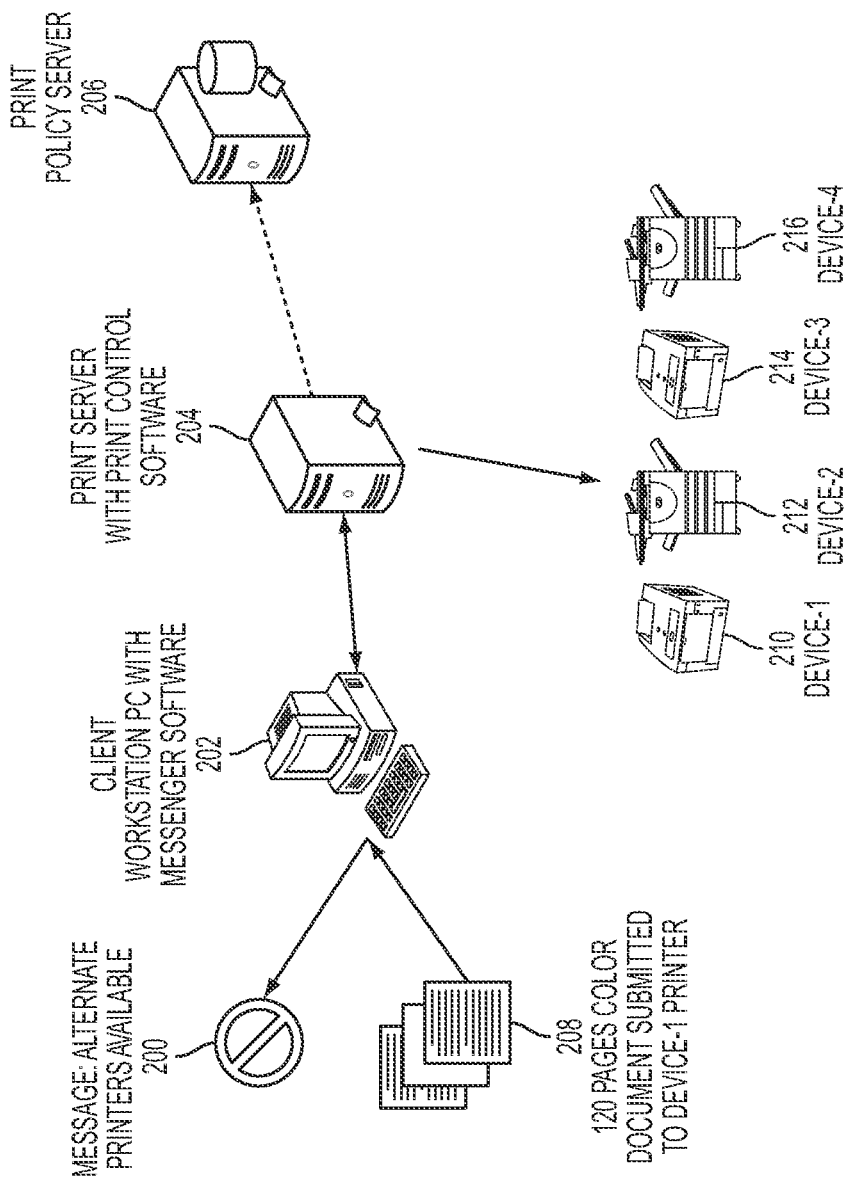
FIG. 2 is a schematic representation of a system according to embodiment herein.

In addition, as shown in FIG. 2, the embodiments herein also include systems. For example, one exemplary system embodiment comprises a print server 204 operatively connected to a workstation 202. Again, the workstation 202 generates the print job 208 and supplies the job 208 to the print server 204. Many available printers 210, 212, 214, 216 are operatively connected to the print server 204 and the print job 208 includes an identification of one of the available printers 210, 212, 214, 216 as the initial printer. A policy server 206 is also operatively connected to the print server 204. The policy server 206 ranks abilities of the available printers 210, 212, 214, 216 to process the print job 208 to identify a best printer for the print job 208.

If the initial printer is not ranked as the best printer, the print server 204 outputs a statement or question 200 on the workstation 202 regarding whether to redirect the print job 208 to the best printer. If the initial printer is ranked as the best printer, the print server 204 allows the print job 208 to be processed by the best printer, without outputting any statements/questions to the user through the workstation 202.

Thus, every time a job is submitted by print user, the policy server 206 performs a computation based on defined policies to deduce if the target printer is the most appropriate and if not, what other alternate printers can be more efficient and appropriate. The user can then either be given a recommendation dialog or forced to print to one of the alternate printers.

The policy server 206 ranks the available printers 210, 212, 214, 216 based on printer characteristics including cost, printer utilization rate, printer capability, printer availability, printer proximity, and user rights to a printer. When presenting the question, the print server 204 can supply to the workstation 202 information regarding ranking characteristics used to determine which printer is the best printer. Similarly, when presenting the question, the print server 204 can supply, to the workstation 202, a plurality of alternate printers 210, 212, 214, 216 that are ranked according to the ranking, from best to worst.

In specific embodiments, print control software can be installed on print the servers 204 and/or user workstations 202. Such print control software is responsible to intercept the print job and calculate that initial target printer and other available printers in the network, which printers may be more appropriate and best suited for the print job. Similarly, message software that can submit print jobs can be installed on the workstation 202 or print server 204. This message software is responsible to receive messaging requests from the print control software and thus show the appropriate message to the user who submitted print job.

In addition, device and policy manager software can be installed on the policy server 206, which can be a dedicated server machine managed by the Administrator. The device and policy manager software is responsible mainly for two items. First, the device and policy manager software can discover print devices and be aware of device capabilities such as; color abilities, speed, duplex abilities etc, dynamic properties such as printer utilization rate, and custom properties such as device location, per page print cost etc. and device status. Secondly, the device and policy manager software can manage user print policies. For example, some policies can allow a certain user to print color, require all users to print only duplex, etc. Device print policies can require that a certain device shall not print black and white print jobs or can restrict a certain device to print jobs only during certain periods of time (8:00 am-5:00 pm) etc.

Figure 3:
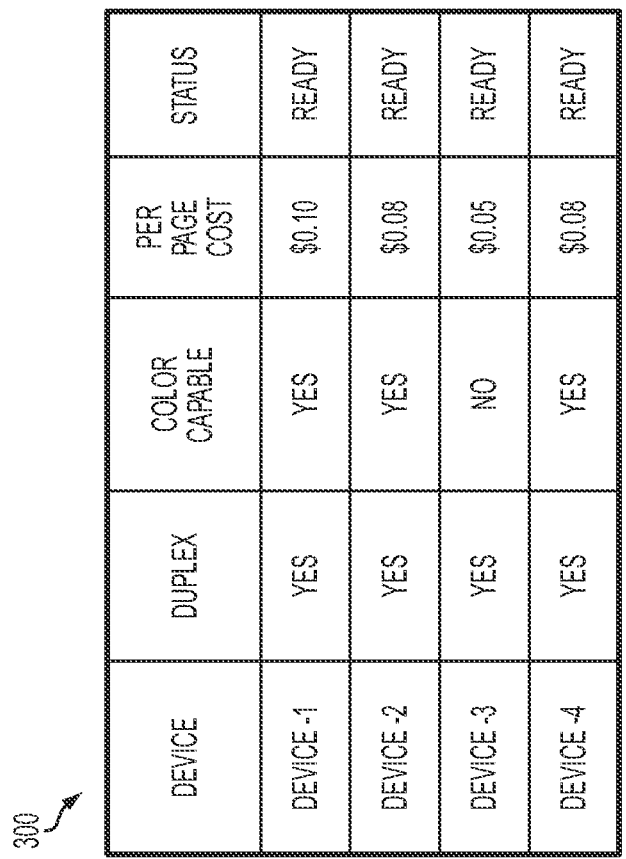
FIG. 3 is a table of printer features according to embodiments herein.

FIG. 3 is a table which indicates some capabilities, cost, and status of the printers 210, 212, 214, 216 shown in FIG. 2. This information can be used by the policy server 206 to rank the printers with respect to the print job 208. The information included within this table is merely one example of the type of information that can be utilized by the policy server 206 to perform the ranking process. One ordinarily skilled in the art would understand that many other sources of information can be used to rank the different printers and that different features of different printers can be weighted differently in the ranking process. Further, FIG. 4 illustrates one exemplary screen shot of the user interface that can output the questions/statements 200 to the user through the workstation 202.

Various computerized devices such as servers and workstations are mentioned above. Computers that include input/output devices, graphic user interfaces, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA, and the details of such devices are not discussed herein for purposes of brevity and reader focus.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Norwalk, Conn., USA. Such printers commonly include input/output, power supplies, processors, media movement devices, marking devices etc., the details of which are omitted herefrom to allow the reader to focus on the salient aspects of the embodiments described herein.

Further, as mentioned above, some conventional systems (such as that disclosed in the previously referenced European Patent Number 1,224,529, also assigned International Publication Number WO 01/29648,) split the printing over more than one printer where there are several copies to be made. Subsystems can also split the printing over more than one printer for a single copy. Cluster printing specifies a group of printers from which a print job can be performed. Color/black-and-white page splitting splits a printer job, sending non-color pages to black-and-white printers and sending pages with color, to color printers. Embodiments herein are equally applicable to such print sharing and splitting systems and methods.

With embodiments herein, costs can be saved by ensuring printing of large print jobs on high volume printers and by restricting printer use to selected users to provide control on print job characteristics. The embodiments herein can encourage the users to print to an appropriate printer by giving them informational messages at the time of print submission to allow users to re-rout the jobs to the best (most suitable) printer as they send the print job to the print server. Thus, embodiments herein intelligently find suitable alternate printers based on computation that incorporates a combination of: the cost of the job if printed at the printer; the printer utilization rate (indicating how much it has been printing over a given period of time); printer compatibility against print job characteristics such as color, duplex needed, etc.; printer availability based on its status; printer proximity based on its location; user rights to print at the printer (user right to print color, print large documents) etc.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
    receiving a print job from a user through a workstation, said print job identifying an initial printer from amongst a plurality of available printers;
    after said receiving of said print job identifying said initial printer, ranking abilities of said available printers to process said print job so as to identify a best printer for completing said print job from said user, said ranking being based on a plurality of printer characteristics associated with each of said available printers, said printer characteristics comprising at least printing cost and printer capability and said ranking further being based on rights of said user to each of said available printers and a print policy restricting at least one of said available printers to any of one of the following: performing only a certain type of printing process and operating only during a certain period of time;
    determining whether said initial printer as identified in said print job is said best printer according to said ranking;
    when said initial printer is said best printer, allowing said initial printer to process said print job; and
    when said initial printer and said best printer are different printers, outputting, to said user through said workstation, a question regarding whether said print job should be immediately redirected to one of said best printer and another alternate printer, information regarding said printer characteristics used, during said ranking, to identify said best printer, and a list of a plurality of alternate printers ranked according to said ranking from said best printer to a worst printer.

2. The method according to claim 1,
    said printer characteristics further comprising printer utilization rate, printer availability, and printer proximity,
    said printing cost comprising a per page cost for printing, and
    said printer capability comprising at least color printing capability, printing speed capability, duplex printing capability, and custom printing capability.

3. The method according to claim 1, said ranking further being based on another print policy specifying rights of said user to certain types of printing processes.

4. The method according to claim 1, said allowing of said print job to be processed by said initial printer being performed without outputting any statements to said user through workstation.

5. A method comprising:
    receiving a print job from a user through a workstation, said print job identifying an initial printer from amongst a plurality of available printers;

after said receiving of said print job identifying said initial printer, ranking abilities of said available printers to process said print job so as to identify a best printer for completing said print job, said ranking being based on a plurality of printer characteristics associated with each of said available printers, said printer characteristics comprising at least printing cost and printer capability and said ranking further being based on rights of said user to each of said available printers and a print policy restricting at least one of said available printers to any of one of the following: performing only a certain type of printing process and operating only during a certain period of time;

determining whether said initial printer is said best printer according to said ranking;

when said initial printer is said best printer, allowing said initial printer to process said print job;

when said initial printer and said best printer are different printers, cancelling said print job and outputting, to said user through said workstation, a statement informing said user to re-submit said print job to an alternate printer and indicating a list of a plurality of alternate printers ranked according to said ranking from said best printer to a worst printer.

6. The method according to claim 5,
said printer characteristics further comprising printer utilization rate, printer availability, and printer proximity, and user rights to a printer,
said printing cost comprising a per page cost for printing, and
said printer capability comprising at least color printing capability, printing speed capability, duplex printing capability, and custom printing capability.

7. The method according to claim 5, said ranking further being based on another print policy specifying rights of said user to certain types of printing processes and said outputting of said statement further comprising supplying said user through said workstation with information regarding said printer characteristics used, during said ranking, to identify said best printer.

8. The method according to claim 5, said allowing of said print job to be processed by said initial printer being performed without outputting any statements to said user through workstation.

9. A system comprising:
a print server operatively connected to a workstation and receiving a print job from a user through said workstation,
a plurality of available printers operatively connected to said print server, said print job identifying one of said available printers as an initial printer; and
a policy server operatively connected to said print server,
said policy server ranking abilities of said available printers to process said print job so as to identify a best printer for completing said print job, said ranking being performed after said print job identifying said initial printer is received and further being based on a plurality of printer characteristics associated with each of said available printers, said printer characteristics comprising at least printing cost and printer capability and said ranking further being based on rights of said user to each of said available printers and a print policy restricting at least one of said available printers to any of one of the following: performing only a certain type of printing process and operating only during a certain period of time,
said print server further determining whether said best printer is said initial printer according to said ranking, and
said print server further allowing said initial printer to process said print job, when said initial printer is said best printer, and outputting to said user through said workstation a question regarding whether said print job should be immediately redirected to one of said best printer and another alternate printer, information regarding said printer characteristics used, during said ranking, to identify said best printer, and a list of a plurality of alternate printers ranked according to said ranking from said best printer to a worst printer, when said initial printer and said best printer are different printers.

10. The system according to claim 9,
said printer characteristics further comprising printer utilization rate, printer availability, printer proximity, and user rights to a printer,
said printing cost comprising a per page cost for printing, and
said printer capability comprising at least color printing capability, printing speed capability, duplex printing capability, and custom printing capability.

11. The system according to claim 9, said ranking further being based on another print policy specifying rights of said user to certain types of printing processes.

12. The system according to claim 9, said print server further allowing said print job to be processed by said best printer without outputting any statements to said user through said workstation, when said initial printer is ranked as said best printer.

13. A computer program product comprising:
a non-transitory computer-readable storage medium storing instructions that, when executed by a computer, cause said computer to perform a method, said method comprising:
receiving a print job from a user through a workstation, said print job identifying an initial printer from amongst a plurality of available printers;
after said receiving of said print job identifying said initial printer, ranking abilities of said available printers to process said print job so as to identify a best printer for completing said print job, said ranking being based on a plurality of printer characteristics associated with each of said available printers, said printer characteristics comprising at least printing cost and printer capability and said ranking further being based rights of said user to each of said available printers and a print policy restricting at least one of said available printers to any of one of the following: performing only a certain type of printing process and operating only during a certain period of time;
determining whether said initial printer is said best printer according to said ranking;
when said initial printer is said best printer, allowing said initial printer to process said print job; and
when said initial printer and said best printer are different printers, outputting to said user through said workstation a question regarding whether said print job should be immediately redirected to one of said best printer and another alternate printer, information regarding said printer characteristics used, during said ranking, to identify said best printer and a list of a plurality of alternate printers ranked according to said ranking from said best printer to a worst printer.

14. The computer program product according to claim 13,
   said printer characteristics further comprising printer utilization rate, printer availability, and printer proximity,
   said printing cost comprising a per page cost for printing, and
   said printer capability comprising at least color printing capability, printing speed capability, duplex printing capability, and custom printing capability.

15. The computer program product according to claim 13, said ranking further being based on another print policy specifying rights of said user to certain types of printing processes.

16. The computer program product according to claim 13, said allowing of said print job to be processed by said best printer being performed without outputting any statements to said user through said workstation.

* * * * *